(12) United States Patent
Hyun

(10) Patent No.: US 10,994,699 B2
(45) Date of Patent: May 4, 2021

(54) CARD KEY FOR VEHICLE

(71) Applicant: Continental Automotive GmbH, Hannover (DE)

(72) Inventor: YoungJin Hyun, Gyeonggi-do (KR)

(73) Assignee: Continental Automotive GmbH

( * ) Notice: Subject to any disclaimer, the term of this patent is extended or adjusted under 35 U.S.C. 154(b) by 0 days.

(21) Appl. No.: 16/677,985

(22) Filed: Nov. 8, 2019

(65) Prior Publication Data

US 2020/0189519 A1 Jun. 18, 2020

(30) Foreign Application Priority Data

Dec. 18, 2018 (KR) .................. 10-2018-0164408

(51) Int. Cl.
  *B60R 25/24* (2013.01)
  *E05B 19/00* (2006.01)
  *G07C 9/00* (2020.01)

(52) U.S. Cl.
  CPC .......... *B60R 25/24* (2013.01); *E05B 19/0082* (2013.01); *G07C 9/00174* (2013.01); *G07C 2009/00976* (2013.01)

(58) Field of Classification Search
  CPC .............. B60R 25/24; G07C 2009/00976
  See application file for complete search history.

(56) References Cited

U.S. PATENT DOCUMENTS

| 9,443,182 | B2 | 9/2016 | Wada | |
|---|---|---|---|---|
| 2009/0212903 | A1* | 8/2009 | Tamezane | G07C 9/00309 340/5.2 |
| 2015/0269470 | A1* | 9/2015 | Wada | G06K 19/0706 235/492 |
| 2016/0250996 | A1* | 9/2016 | Park | E05B 19/00 701/2 |
| 2017/0332499 | A1* | 11/2017 | Senzaki | H05K 5/0017 |

FOREIGN PATENT DOCUMENTS

| KR | 101602141 BI | 3/2016 |
|---|---|---|
| KR | 20160139689 A | 12/2016 |
| KR | 20170033204 A | 3/2017 |
| KR | 20180019944 A | 2/2018 |

* cited by examiner

*Primary Examiner* — Qutbuddin Ghulamali
(74) *Attorney, Agent, or Firm* — RatnerPrestia

(57) ABSTRACT

A vehicle card key, includes: a mainboard part on which an electronic element for wireless transmitting/receiving with a vehicle is mounted; a connector part formed on the mainboard part; a housing part which covers the mainboard part avoiding the connector part; and a switchboard part which has at least one among a switch and light-emitting diode mounted thereon, and which is layered on the mainboard part and is connected to the connector part.

13 Claims, 6 Drawing Sheets

CARD KEY FOR VEHICLE

CROSS REFERENCE TO RELATED APPLICATIONS

This application claims priority to Korean Patent Application No. 10-2018-0164408, filed Dec. 18, 2018, the contents of such application being incorporated by reference herein.

FIELD OF THE INVENTION

The present invention relates to a vehicle card key, and more specifically to a vehicle card key for switching a locked state or running state of the vehicle.

BACKGROUND OF THE INVENTION

In general, vehicle keys are used when locking or unlocking the vehicle doors or starting the vehicle, and in recent years, rather than a method in which a user locks or unlocks a door by directly coupling the blade of a vehicle key to a keyhole of the door, smart keys operated at long range using a radio frequency identification (RFID) method are mainly used.

Among such smart keys, card keys having an easy-to-carry card shape are widely used. Such a vehicle card key is a device which is easy to store since a transceiver, a board, a battery, and the like are installed inside a card-shaped housing part, and which is capable of remotely controlling the vehicle. Button card keys have a tact switch mounted on their circuit board to realize a button function.

Normally, a plurality of tact switches and light-emitting elements such as LEDs are provided on a vehicle card key, such electronic elements are arranged scattered across a substantial portion including the central part on the front surface part of the vehicle card key, in order to provide convenience, aesthetics and the like. In addition, the housing part is injection molded with the circuit board inserted therein, in order to guarantee stiffness, form the exterior and the like.

In the prior art, in order to prevent the injected material for molding of the housing part from interfering with the tact switch(es) and light-emitting element(s), relative to the circuit board, the housing part is molded only on the rear surface part and edges of the circuit board and a plurality of sheet members are layered in multiple stages on the front surface part of the circuit board on which the tact switch(es) and light-emitting element(s) are arranged.

In order to achieve a predetermined stiffness, the housing part must have a predetermined thickness, and since such a vehicle card key of the prior art has a thickness that is the housing part thickness, the circuit board thickness, the tact switch thickness, and the sheet thickness all added together, there are limitations on making the card key slim. Furthermore, since the separate sheets having a thickness capable of compensating for the tact switch must be coupled to the front surface part of the circuit board, there are limitations on the simplification of the sheet structure.

Furthermore, there is a problem in that if overflow of the injected material toward the front surface part of the circuit board occurs when molding the housing part, there is still the risk that faults will occur in the tact switch(es) and the light-emitting element(s), and thus particular care is required so that the overflow of injected material covering the entire front surface part of the circuit board does not occur.

Korean Unexamined Patent Publication KR 2018-0019944 A (Laid-open 27 Feb. 2018, Title of the Invention: CARD-TYPE SMART KEY FOR VEHICLE), and incorporated herein by reference, discloses background art of an aspect of the present invention.

SUMMARY OF THE INVENTION

The aspect of the present invention is a vehicle card key which can be manufactured to a thinner thickness while being able to facilitate improvements to productivity as a result of the simplification of the sheet structure, and which can decrease the occurrence of faults due to overflow of injected material.

A vehicle card key according to an aspect of the present invention is characterized by comprising: a mainboard part on which is mounted an electronic element for wireless transmitting/receiving with a vehicle; a connector part formed on the mainboard part; a housing part which covers the mainboard part while avoiding the connector part; and a switchboard part which has at least one among a switch and a light-emitting diode mounted thereon, and which is layered on the mainboard part and is connected to the connector part.

The switchboard part is characterized in that it comprises a flexible printed circuit board (FPCB).

The mainboard part is characterized in that it comprises a rigid printed circuit board (RPCB).

The housing part is characterized by being formed by molding a thermosetting resin and by comprising: a first molded part covering the front surface part of the mainboard part; a second molded part covering the rear surface part of the mainboard part; a third molded part covering the rim of the mainboard part; and a non-molded part which is formed, so as to be hollow, in a location corresponding to the connector part and which has a shape corresponding to the switchboard part.

The switchboard part is characterized by comprising: a flexible board part comprising a flexible material; a switch part which comprises a switch and is mounted on the flexible board part; and a connector-connecting part which is formed on the flexible board part and is connected to the connector part.

The flexible board part is characterized by comprising: an element-mounting part on which the switch part is mounted; an extended part which is linked to the element-mounting part and is formed extending toward the connector part; and a mainboard-connecting part which is formed on an end part of the extended part and on which the connector-connecting part is formed and which is arranged so as to be layered on the connector part.

The switch part is characterized by comprising: a first switch part arranged on the front surface part of the mainboard part; and a second switch part arranged spaced apart from the first switch part on the front surface part of the mainboard part.

The switchboard part is characterized by further comprising: a light-emitting diode part which comprises a light-emitting diode and is mounted on the flexible board part.

An aspect of the present invention is characterized by further comprising: a reinforcing assembly part which comprises a metal material, is assembled with the mainboard part and is formed extending to the location corresponding to the connector part.

The reinforcing assembly part is characterized by comprising: a first key storage part which comprises a metal material and forms a storage space for an auxiliary key part;

a second key storage part which comprises a metal material and is arranged facing the first key storage part; and a rear-surface support part which is formed on at least one side among the first key storage part and the second key storage part and is formed extending toward the connector part so as to be able to support the connector part.

The rear-surface support part is characterized by comprising: a first rear-surface support part which is formed extending from the first key storage part toward the connector part and is arranged so as to be layered on the mainboard part.

The rear-surface support part is characterized by further comprising: a second rear-surface support part which is formed extending from the second key storage part toward the connector part and is arranged so as to be layered on the mainboard part and the first rear-surface support part.

The vehicle card key according to an aspect of the present invention has a structure in which electronic elements such as switches and light-emitting diodes, which can develop faults when there is interference with the injected material for molding the housing part, are not directly mounted on the mainboard part, but are mounted separately on the switchboard part. Accordingly, insert injection may be performed so as to position the mainboard part in the middle part in the thickness direction of the housing without needing to be concerned about interference between the switches and light-emitting diodes and the injected material which overflowed whilst molding the housing part.

Furthermore, in an aspect of the present invention, the switchboard part can be positioned inside the housing part, by forming the first molded part which covers the front surface part of the mainboard part in the housing part to a thickness corresponding to the thickness of the switchboard part, and by forming the non-molded part in a shape corresponding to the switchboard part in the position corresponding to the switchboard part, and accordingly an aspect of the present invention may be, manufactured to a thinner thickness compared to the prior art, by an amount corresponding to the thickness of the switchboard part.

More specifically, in an aspect of the present invention, it is possible to achieve slimming to an extent corresponding to the thickness of the switch in comparison to the prior art in which, in order to prevent the injected material in the prior art from interfering with the switch and light-emitting diode, relative to the circuit board, the housing part is molded only on the rear surface part of the circuit board, and has a thickness that is the housing part thickness, the circuit board thickness, the switch thickness, and the sheet thickness all added together.

Furthermore, according to an aspect of the present invention, in comparison to the prior art in which, in order to compensate for the thickness of the switch, a separate sheet member is additionally coupled to the front surface part of the circuit board, it is sufficient to attach and finish a single sheet in order to finish the front surface part of the housing part, thereby making it possible to simplify the sheet structure, and consequently possible to facilitate improvements to productivity.

Furthermore, according to an aspect of the present invention, when forming the non-molded part, it is sufficient to perform an injection process without the occurrence of overflow of the injected material in only the narrow region corresponding to the connector part, and thus, compared to the prior art in which special care is required so that the overflow of injected material across the entire front surface part of the circuit board does not occur, an aspect of the present invention can be manufactured more easily, and the defect incidence rate due to overflow of injected material can be reduced.

DETAILED DESCRIPTION OF THE PREFERRED EMBODIMENTS

Figure 1:
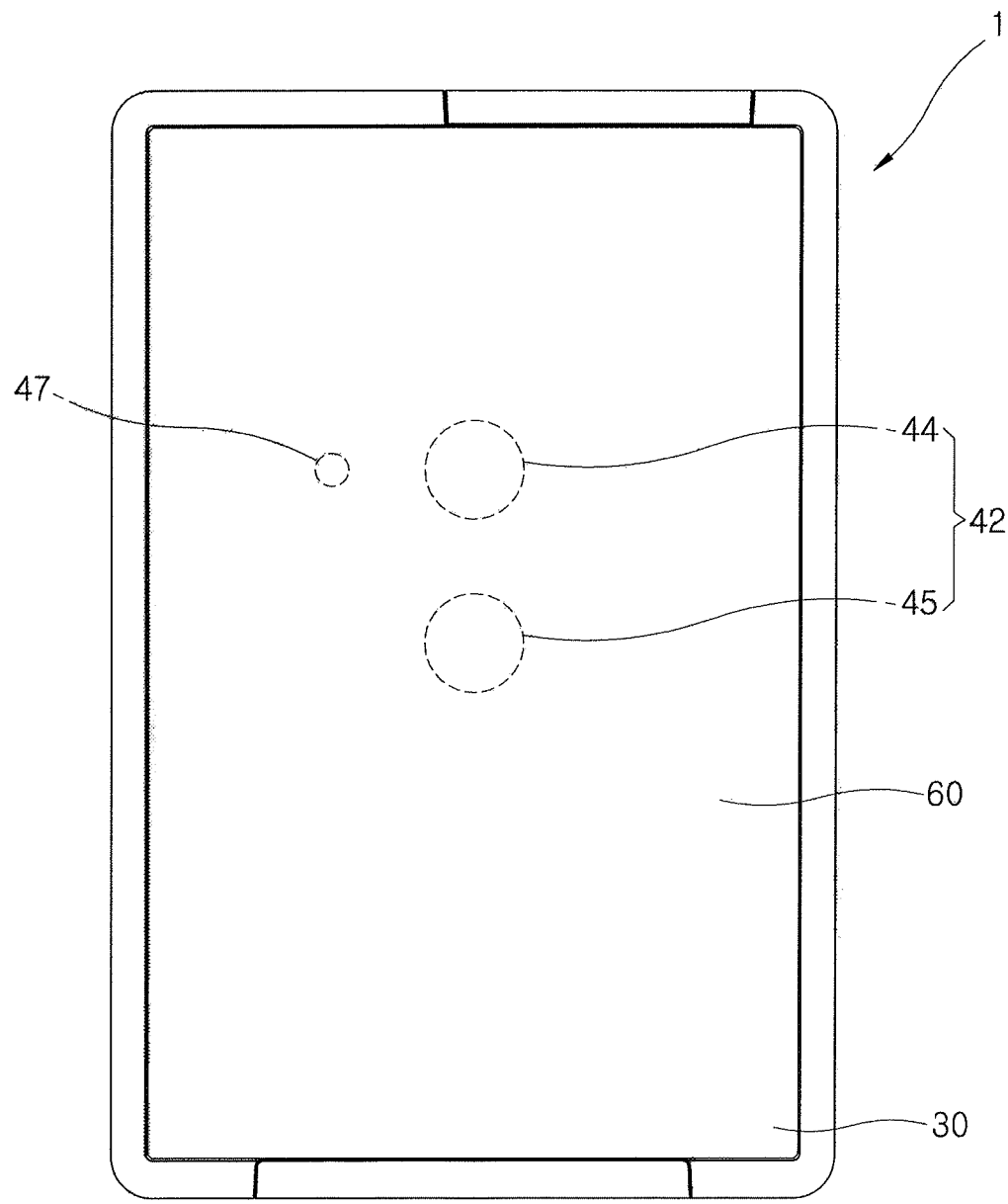
FIG. 1 is a front view schematically illustrating a vehicle card key according to an embodiment of the present invention.

Hereinafter, an embodiment of a vehicle card key according to an aspect of the present invention will be described with reference to the accompanying drawings. In this process, aspects such as the thickness of lines or the size of the components shown in the drawings may be exaggerated for the clarity of the description and convenience. In addition, the following terms are defined in consideration of the functions of an aspect of the present invention, which may vary depending on the intention of a user or an operator or customary practice. Therefore, the definitions of these terms should be based on the content throughout the whole of this specification.

Figure 2:
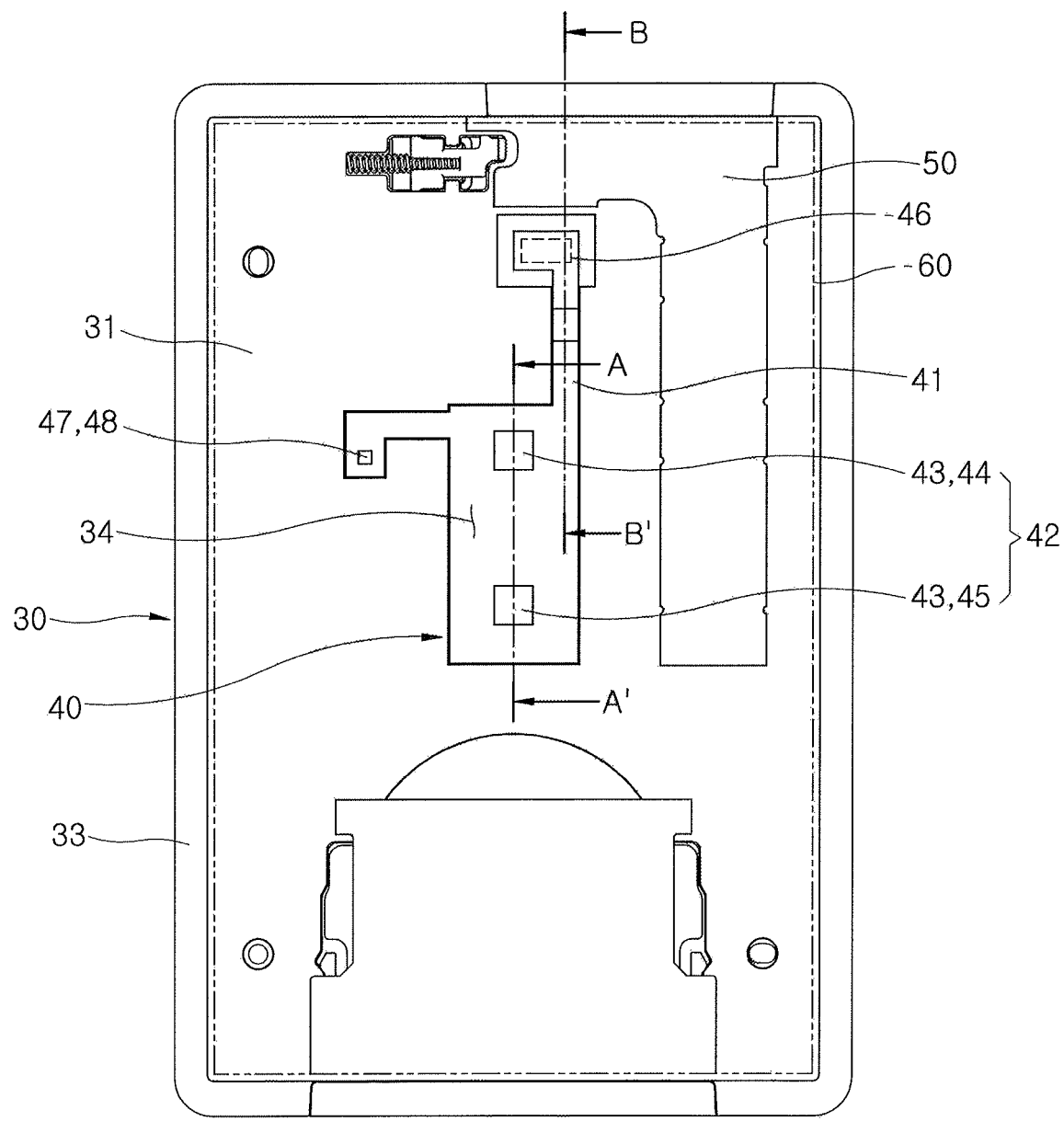
FIG. 2 is a front view schematically illustrating essential parts of a vehicle card key according to the embodiment of the present invention.
Figure 3:
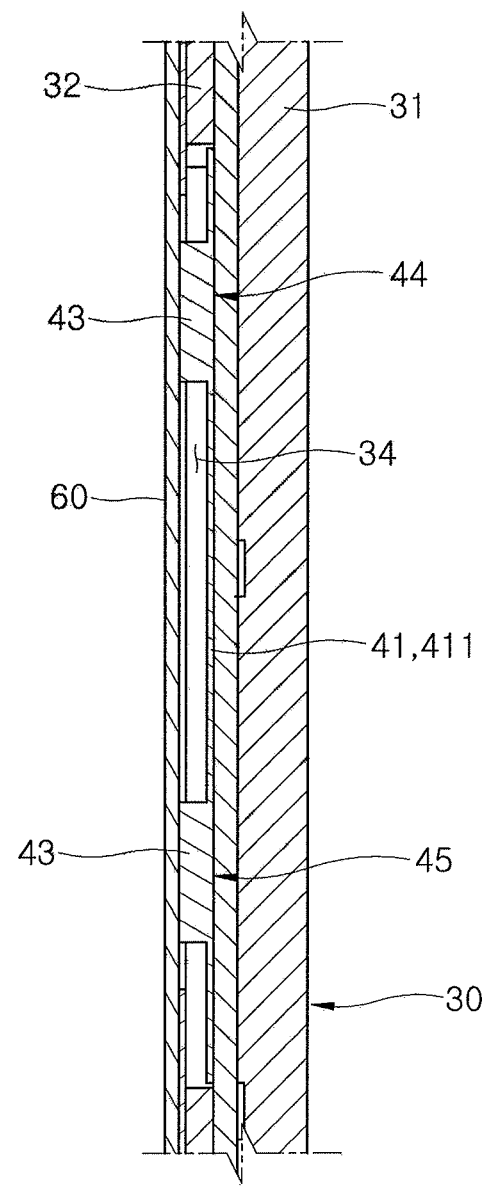
FIG. 3 is a cross-sectional view along line A-A' in FIG. 2.
Figure 4:
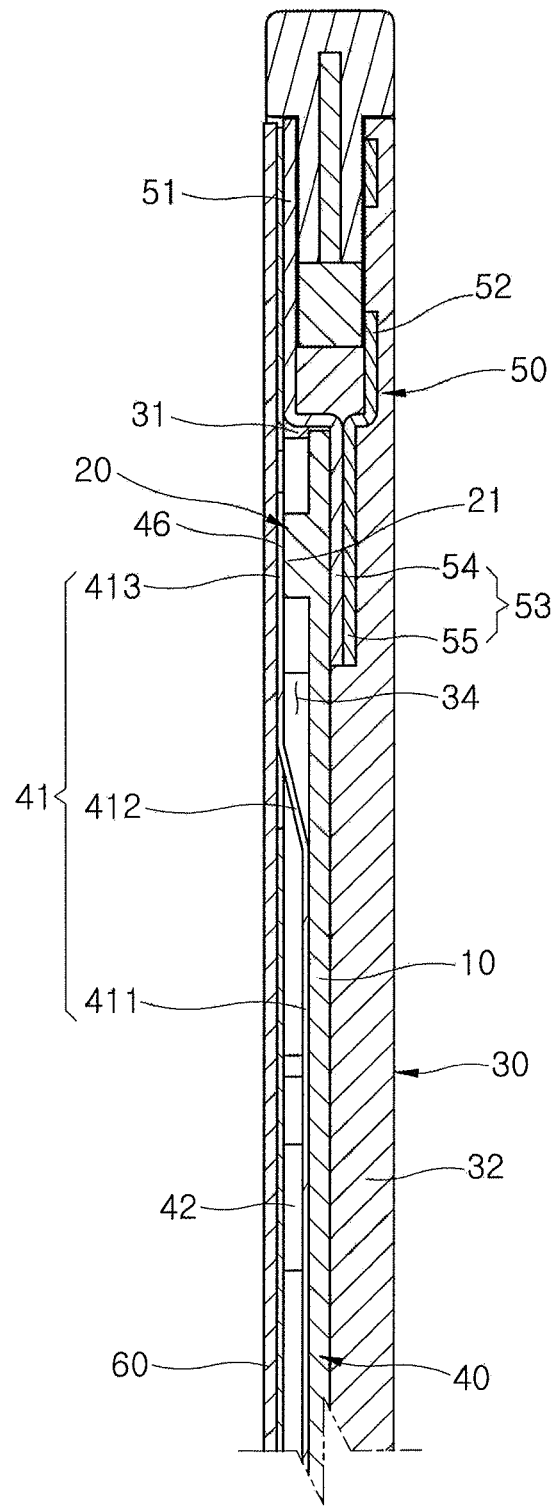
FIG. 4 is a cross-sectional view along line B-B' in FIG. 2.
Figure 5:
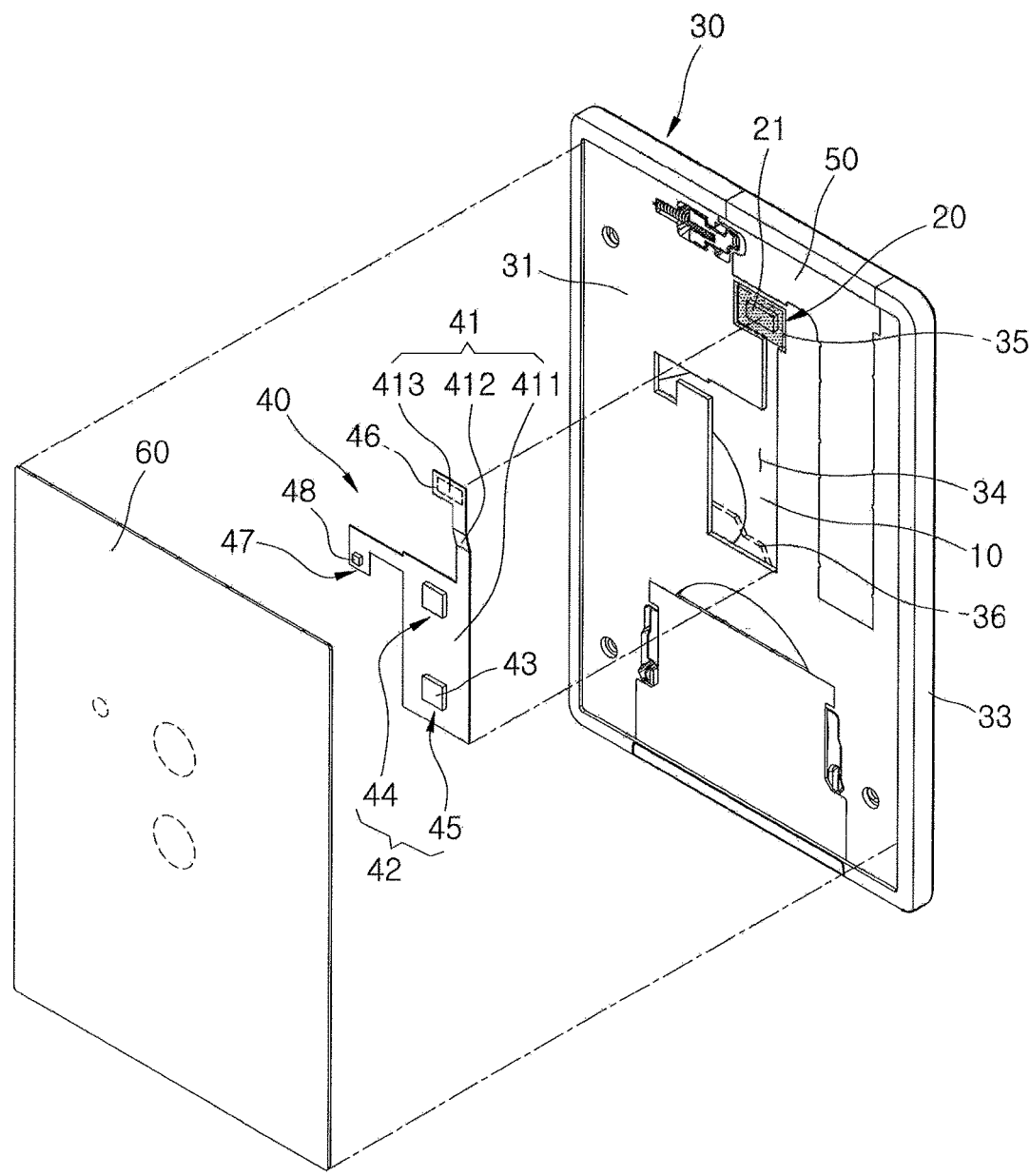
FIG. 5 is an exploded perspective view schematically illustrating essential parts of a vehicle card key according to the embodiment of the present invention.
Figure 6:
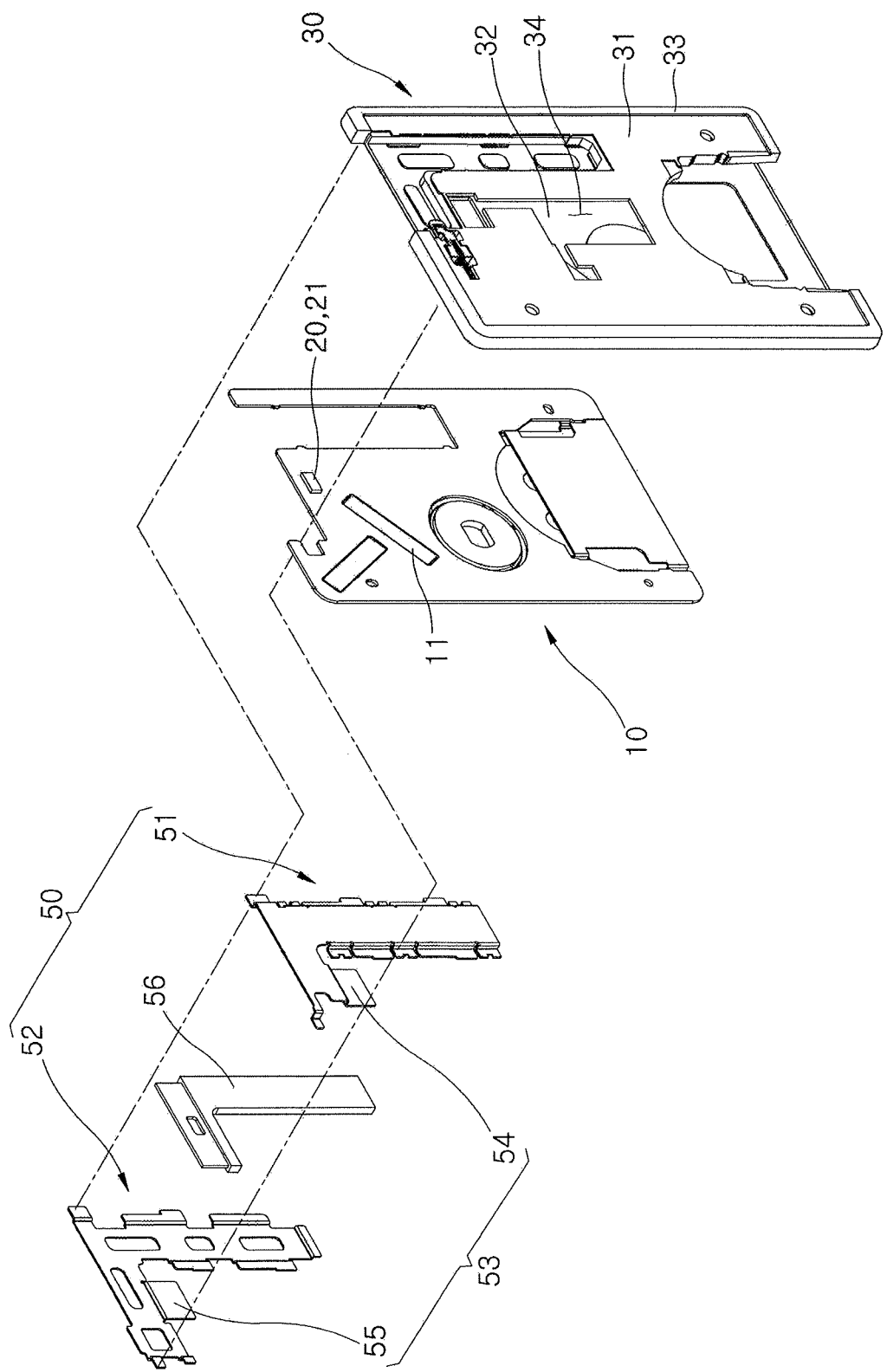
FIG. 6 is an exploded perspective view of the essential parts of a housing part, a mainboard part, and a reinforcing assembly part of a vehicle card key according to the embodiment of the present invention.

FIG. 1 is a front view schematically illustrating a vehicle card key according to an embodiment of the present invention, FIG. 2 is a front view schematically illustrating essential parts of a vehicle card key according to the embodiment of the present invention, FIG. 3 is a cross-sectional view along line A-A' in FIG. 2, FIG. 4 is a cross-sectional view along line B-B' in FIG. 2, FIG. 5 is an exploded perspective view schematically illustrating essential parts of a vehicle card key according to the embodiment of the present invention, and FIG. 6 is an exploded perspective view of essential parts of a housing part, a mainboard part, and a reinforcing assembly part of a vehicle card key according to the embodiment of the present invention.

Referring to FIGS. 1, 2, and 5, the vehicle card key (1) according to the embodiment of the present invention comprises a mainboard part (10), a connector part (20), a housing part (30), a switchboard part (40), and a reinforcing assembly part (50).

An electronic element (11) for wireless transmitting/receiving with a vehicle is mounted on the mainboard part (10). A rigid printed circuit board (RPCB) may be used as the mainboard part (10). The connector part (20) is the part of the device for electrically connecting the mainboard part (10) and the switchboard part (40) to each other and the connector part (20) comprises a connector element (21) and is formed in a predetermined position on the mainboard part (10). The connector part (20) is not limited to a particular structure or form as long as it comprises a metal material or the like and can be electrically connected to the switchboard part (40).

In the embodiment of the present invention, the connector part (20) is arranged to be biased away from the switch part (42) toward the reinforcing assembly part (50) rather than the central portion where the switch part (42) is arranged. Because of such an arrangement of the connector part (20), the connector part (20) can be positioned in a place with comparatively superior stiffness in the thickness direction compared to other sections of the mainboard part (10) due to assembly and layering with the reinforcing assembly part (50).

Accordingly, by performing an injection process when the mainboard part (10) is under pressure in a mold in order to form a non-molded part (34) of the housing part (30), the non-molded part (34) can be formed stably while applying a greater pressing force at the position corresponding to the non-molded part (34).

The connector part (20) according to the embodiment of the present invention is disclosed as a preferred embodiment, but the positioning of the connector part (20) is not intended to be particularly limited. The connector part (20) may be freely arranged anywhere on the mainboard part (10) as long as it can electrically connect the mainboard part (10) and the switchboard (40) together. By way of example of another embodiment, the connector part (20) in FIG. 2 may be arranged below of the reinforcing assembly part (50), and if necessary may also be arranged in the central portion where the switch part (42) and a light-emitting diode part (47) are positioned.

The housing part (30) is the part of the device for protecting the mainboard part (10) and ensuring stiffness while forming the exterior, and the housing part (30) covers the mainboard part (10), avoiding the connector part (20). The housing part (30) may be formed by insert injecting the mainboard part (10) and the reinforcing assembly part (50).

A thermosetting resin such as epoxy may be used as the material for the housing part (30).

The switchboard part (40) is the part of the device that has at least one among the switch (43) and the light-emitting diode (48) mounted therein and is electrically connected to the mainboard part (10), and the switchboard part (40) is arranged so as to be layered on the front surface part of the mainboard part (10) and is connected to the connector part (20). A flexible printed circuit board (FPCB) may be used as the switchboard part (40).

By using a flexible printed circuit board as the switchboard part (40), compared to using a rigid printed circuit board, it is possible to substantially achieve the slimming of the vehicle card key (1), which is intended to be achieved by an aspect of the present invention. Furthermore, as the switchboard part (40) has flexibility, the topology in the thickness direction may bend differently in different areas as happens with the shape of the extended part (412) shown in FIGS. 4 and 5, so the switchboard part (40) may be arranged in a spatially efficient manner on the space-limited portion of the non-formed part (34) (especially in the thickness direction width).

The reinforcing assembly part (50) is the part of the device which, when layered on the mainboard part (10), relatively strengthens stiffness with respect to loads acting in the thickness direction together with the mainboard part (10), and the reinforcing assembly part (50) has a structure comprised of a metal material and is assembled with the mainboard part (10) and is formed extending up to the location corresponding to the connector part (20). By way of example of the reinforcing assembly part (50) in an embodiment of the present invention, the reinforcing assembly part (50) has a structure in which key storage parts (51, 52) for storing an auxiliary key part (56) are used (see FIG. 6).

The reinforcing assembly part (50) according to the embodiment of the present invention has been disclosed as a preferred embodiment, but the components that can be used as the reinforcing assembly part (50) are not intended to be particularly limited. Aside from the key storage parts (51, 52), various other metal material components may be provided in the vehicle card key (1), and one or a plurality of such metal material components may be selected and freely used as the reinforcing assembly part (50). A battery storage part (drawing reference numeral not given) may be used as the reinforcing assembly part (50), and a separate reinforcing member predominantly for realizing a reinforcing function may also be used as necessary.

Referring to FIGS. 5 and 6, the housing part (30) according to an embodiment of the present invention comprises a first molded part (31), a second molded part (32), a third molded part (33), and a non-molded part (34).

The first molded part (31) covers the front surface part of the mainboard part (10), and the second molded part (32) covers the rear surface part of the mainboard part (10). The first molded part (31) and the second molded part (32) have a predetermined thickness capable of achieving a predetermined stiffness together with the mainboard part (10) when coupled thereto. In this instance, the first molded part (31) has a thickness corresponding to the thickness of the switchboard part (40) and is formed continuing on in a planar manner, and the second molded part (32) has the thickness that remain when the thickness of the first molded part (31) is subtracted from the predetermined thickness and is formed continuing on in a planar manner.

The third molded part (33) is the part of the device forming the edges of the housing part (30), and the third molded part (33) covers the rim of the mainboard part (10) and is integrally linked to the first molded part (31) and the second molded part (32). The first molded part (31), the second molded part (32) and the third molded part (33) are injection molded as one piece in a state in which the main board part (10) and the reinforcing assembly part (50) have been inserted.

The non-molded part (34) is the part of the device not formed by injection molding, which is to say the part of the housing part (30) which does not cover the mainboard part (10), and the non-molded part (34) is formed so as to be hollow, in the first molded part (31), and more specifically in a shape corresponding to the switchboard part (40) in a position corresponding to the connector part (20).

The non-molded part (34) is formed by a board-pressing part (not shown) having a shape corresponding thereto, in the injection mold (not shown) for molding the housing part (30). The non-molded part (34) may be formed by carrying out an injection process in which the injection material is injected into the injection mold and is cooled and cured in a state in which the front surface part of the mainboard part (10) is pressed upon by the board-pressing part.

Referring to FIGS. 2 and 5, the switchboard part (40) according to an embodiment of the present invention comprises a flexible board part (41), a switch part (42), a connector-connecting part (46), and a light-emitting diode part (47).

The flexible board part (41) comprises a flexible material such as poly-imide film, copper foil and the like and has a plate-like shape. Referring to FIGS. 4 and 5, the flexible board part (41) according to the embodiment of the present invention comprises an element-mounting part (411), an extended part (412), and a mainboard-connecting part (413).

The feel during operation and the light-radiating performance of the switch (43) of the switch part (42), the light-emitting diode (48) of the light-emitting diode part (47) and the like due to very slight interference with the injected material for molding the housing part (30), and thus there is performance deterioration. It is preferred that an element-mounting part (411) is used to mount sensitive electronic elements (11), of which the desired performance is negatively affected when there is interference with the housing part (30), such as the switch part (42) and the light-emitting diode part (47).

A plurality of switch parts (42) including a first switch part (44) and a second switch part (45), and the light-emitting diode part (47) are mounted on the element-mounting part (411) according to the embodiment of the present invention. In the embodiment of the present invention, the first switch part (44) and the second switch part (45) are arranged so as to be spaced apart by a fixed interval in the vertical direction on the central portion of the front surface part of the mainboard part (10). Furthermore, the light-emitting diode part (47) has a structure in which the light-emitting diode part (47) has been arranged so as to be spaced apart by a fixed interval to the left side of the switch part (42).

The first switch part (44) and the second switch part (45) may respectively be input devices for generating signals to lock and unlock the door of a vehicle. The light-emitting diode part (47) may selectively indicate the battery state or various states of the vehicle card key such as input operation of the switch unit (42) by means of methods such as turning on, turning off and flashing.

The arrangement of such a switch part (42) and a light-emitting diode part (47) involves a structural arrangement used in conventional vehicle card keys (1), and has been disclosed as an embodiment with the intention of showing that it is possible to use such an arrangement and design with the vehicle card key (1) according to an aspect of the present invention as well. Aside from the switch part (42) and the light-emitting diode part (47), electronic elements (11) for realizing various other functions may be freely mounted in various arrangements on the element-mounting part (411) according to the embodiment of the present invention.

The extended part (412) is formed extending from the element-mounting part (411) toward the connector part (20). The extended part (412) has the function of a bridge connecting the element-mounting part (411) and the mainboard-connecting part (413) and may be extended in various widths, lengths, and shapes. In an embodiment of the present invention, the extended part (412) has a structure extending linearly along a path corresponding to the minimum distance from the element-mounting part (411) to the connector part (20). In another embodiment, the extended part (412) may also extend so as to bend to avoid other electronic elements (11) mounted on the mainboard part (10).

The mainboard-connecting part (413) is formed on the end of the extended part (412) so as to have a width that is wider than the connector part (20). The connector-connecting part (46), which connects to the connector part (20), is formed on the mainboard-connecting part (413). The connector-connecting part (46) is not limited to a particular structure, material or form provided that it can be electrically connected to the connector part (20). Referring to FIGS. 3 and 4, in this instance, the thickness achieved by layering the connector-connecting part (46), the connector part (20) and the mainboard-connecting part (413) is a thickness corresponding to the depth of the non-molded part (34) and the thickness achieved by layering the switch part (42) or light-emitting diode part (47) and the element-mounting part (411). Accordingly, the adhesion of a sheet (60), which covers the switchboard part (40) and is adhered to the front surface part of the housing part (30), which is to say, adhered to the first molded part (31), can be guaranteed to be more stable.

Referring to FIG. 6, the reinforcing assembly part (50) according to an embodiment of the present invention comprises a first key storage part (51), a second key storage part (52), and a rear-surface support part (53).

The first key storage part (51) forms a part of the storage space for an auxiliary key part (56). The second key storage part (52) is arranged facing the first key storage part (51) and forms the other part of the storage space for the auxiliary key part (56). The first key storage part (51) and the second key storage part (52) together form a storage space from which the auxiliary key part (56) can be withdrawn and in which the auxiliary key part (56) can be stored. It comprises a metal material, The rear-surface support part (53) is formed extending from the first key storage part (51) and the second key storage part (52) toward the connector part (20). The rear-surface support part (53) is positioned to the rear of the mainboard part (10) on the same transverse plane as the connector part (20), and provides the connector part (20) with rear-surface support.

By means of such a rear-surface support part (53), the rear supporting force can be strengthened with respect to the pressing force of the board-pressing part applied to the connector part (20) from the front when molding the housing part (30). Referring to FIG. 6, the rear-surface support part (53) according to the embodiment of the present invention comprises a first rear-surface support part (54), and a second rear-surface support part (55).

The first rear-surface support part (54) is formed extending from the first key storage part (51) toward the connector part (20), and is arranged so as to be layered on the mainboard part (10). The second rear-surface support part (55) is formed extending from the second key storage part (52) toward the connector part (20), and is arranged so as to be layered on the mainboard part (10) and the first rear-surface support part (54). The first key storage part (51) and the second key storage part (52) comprise a metal material, and, in addition, the first rear-surface support part (54) and the second rear-surface support part (55) also comprise a metal material, thus providing the connector part (20) with rear-surface support when layered in multiple stages.

When the region corresponding to the connector part (20) is formed in the non-molded part (34), the overflow of injected material can be prevented in a more stable manner by means of the rear-surface support and stiffness-strengthening actions of the reinforcing assembly part (50) as described above. When forming the non-molded part (34), it is sufficient that the overflow of the injected material does not occur in only the narrow region corresponding to the connector part (20) (hereinbelow, an overflow prevention part (35)) as described above.

Even if, as shown in FIG. 5, a small amount of overflow of the injected material (hereinbelow, injection overflow part (36)) occurs in a location corresponding to the element-mounting part (411) in the non-molded part (34), there is absolutely no interference with the switch part (42) or the light-emitting diode part (47), and there is absolutely no effect on the performance achieved by the switch part (42) and the light-emitting diode part (47).

In other words, according to an aspect of the present invention, since there is not any issue of the injection overflow part (36) interfering with the switch part (42) and the light-emitting diode part (47), even within the non-molded part (34) it is sufficient to perform the injection process of the housing part (30) such that overflow of the injected material does not occur in only the narrow region corresponding to the overflow prevention part (35) which is a portion corresponding to the connector part (20).

According to the vehicle card key (1) according to an aspect of the present invention having the configuration described above, the vehicle card key (1) has a structure in which electronic elements (11) such as a switch (43) and a light-emitting diode (48), which can develop faults when there is interference with the injected material for molding the housing part (30), are not directly mounted on the mainboard part (10), but are mounted separately on the switchboard part (40). Accordingly, insert injection can be performed so as to position the mainboard part (10) in the middle part in the thickness direction of the housing part (30) without needing to be concerned about interference between the switch (43) and light-emitting diode (48) and injected material which overflowed whilst molding the housing part (30).

Furthermore, in an aspect of the present invention, it is possible to position the switchboard part (40) inside the housing part (30), by forming the first molded part (31) and non-molded part (34) of the housing part (30), such that the first molded part (31) which covers the front surface part of the mainboard part (10) is formed to a thickness corresponding to the thickness of the switchboard part (40), and the non-molded part (34) is formed in a shape corresponding to the switchboard part (40) in the position corresponding to the switchboard (40), and accordingly an aspect of the present invention can be manufactured to a thinner thickness compared to the prior art, by an extent corresponding to the thickness of the switchboard part (40).

More specifically, an aspect of the present invention can achieve slimming to an extent which corresponds to the thickness of the switch (43) in comparison to the prior art in which, in order to prevent the injected material from interfering with the switch (43) and light-emitting diode (48), relative to the circuit board, the housing part is molded only on the rear surface part of the circuit board, and has a thickness that is the housing part (30) thickness, the circuit board thickness, the switch (43) thickness, and the sheet (60) thickness all added together.

Furthermore, according to an aspect of the present invention, in comparison to the prior art in which, in order to compensate for the thickness of the switch (43), a separate sheet member is additionally coupled to the front surface part of the circuit board, it is sufficient to attach and finish a single sheet (60) in order to finish the front surface part of the housing part (30), thereby making it possible to simplify the sheet structure, and consequently possible to facilitate improvements to productivity.

Furthermore, according to an aspect of the present invention, when forming the non-molded part (34), it is sufficient to perform an injection process without the occurrence of overflow of the injected material in only the narrow region corresponding to the connector part (20), and thus, compared to the prior art in which special care is required so that the overflow of injected material across the entire front surface part of the circuit board does not occur, an aspect of the present invention can be manufactured more easily, and the defect incidence rate due to overflow of the injected material can be reduced.

Although an aspect of the present invention has been described with reference to the embodiments illustrated in the drawings, this is merely illustrative. It will be understood by those skilled in the art that various modifications and other equivalent embodiments are possible. Accordingly, the true scope of technical protection of an aspect of the present invention should be determined by the following claims.

EXPLANATION OF THE REFERENCE NUMERALS

| | |
|---|---|
| 1: Vehicle card key | 10: Mainboard part |
| 11: Electronic element | 20: Connector part |
| 21: Connector element | 30: Housing part |
| 31: First molded part | 32: Second molded part |
| 33: Third molded part | 34: Non-molded part |
| 35: Overflow prevention part | 36: Injection overflow part |
| 40: Switchboard part | 41: Flexible board part |
| 42: Switch part | 43: Switch |
| 44: First switch part | 45: Second switch part |
| 46: Connector-connecting part | 47: Light-emitting diode part |
| 48: Light-emitting diode | 50: Reinforcing assembly part |
| 51: First key storage part | 52: Second key storage part |
| 53: Rear-surface support part | 54: First rear-surface support part |
| 55: Second rear-surface support part | 56: Auxiliary key part |
| 60: Sheet | 411: Element-mounting part |
| 412: Extended part | 413: Mainboard-connecting part |

The invention claimed is:

1. A vehicle card key, comprising:
   a mainboard part on which an electronic element for wireless transmitting/receiving with a vehicle is mounted;
   a connector part formed on the mainboard part;
   a housing part which covers the mainboard part avoiding the connector part, the housing part comprising, formed by molding a thermosetting resin:
      a first molded part covering the front surface part of the mainboard part;
      a second molded part covering the rear surface part of the mainboard part; and
      a non-molded part which is formed to be a hollow in the first molded part in a location corresponding to the connector part, the non-molded part having a shape corresponding to the switchboard part; and
   a switchboard part which has at least one among a switch and light-emitting diode mounted thereon, and which is layered on the mainboard part in the hollow in the first molded part formed by the non-molded part and is connected to the connector part.

2. The vehicle card key of claim 1, wherein
the switchboard part comprises a flexible printed circuit board (FPCB).

3. The vehicle card key of claim 2, wherein
the mainboard part comprises a rigid printed circuit board (RPCB).

4. The vehicle card key of claim 1, wherein
the housing part further comprises, formed by molding the thermosetting resin,
a third molded part covering the rim of the mainboard part.

5. The vehicle card key of claim 1, wherein
the switchboard part comprises:
a flexible board part comprising a flexible material;
a switch part which comprises a switch and is mounted on the flexible board part; and a connector-connecting part which is formed on the flexible board part and is connected to the connector part.

6. The vehicle card key of claim 5, wherein the flexible board part comprises:

an element-mounting part on which the switch part is mounted;

an extended part which is linked to the element-mounting part and is formed extending toward the connector part; and a mainboard-connecting part which is formed on an end part of the extended part and on which the connector-connecting part is formed, and which is arranged so as to be layered on the connector part.

7. The vehicle card key of claim 5, wherein the switch part comprises:

a first switch part arranged on the front surface part of the mainboard part; and a second switch part arranged spaced apart from the first switch part on the front surface part of the mainboard part.

8. The vehicle card key of claim 5, wherein the switchboard part comprises a light-emitting diode part which comprises a light-emitting diode and is mounted on the flexible board part.

9. The vehicle card key of claim 1, further comprising:

a reinforcing assembly part which comprises a metal material, is assembled with the mainboard part and is formed extending up to the location corresponding to the connector part.

10. The vehicle card key of claim 9, wherein the reinforcing assembly part comprises:

a first key storage part which forms a storage space for an auxiliary key part;

a second key storage part which is arranged facing the first key storage part; and a rear-surface support part which is formed on at least one side among the first key storage part and the second key storage part and is formed extending toward the connector part so as to be able to support the connector part.

11. The vehicle card key of claim 10, wherein the rear-surface support part comprises a first rear-surface support part which is formed extending from the first key storage part toward the connector part and is arranged so as to be layered on the mainboard part.

12. The vehicle card key of claim 11, wherein the rear-surface support part comprises a second rear-surface support part which is formed extending from the second key storage part toward the connector part and is arranged so as to be layered on the mainboard part and the first rear-surface support part.

13. The vehicle card key of claim 1, wherein the first molded part of the housing part has a thickness corresponding to a thickness of the switchboard part.

* * * * *